Patented May 14, 1935

2,001,582

UNITED STATES PATENT OFFICE 2,001,582

BELT TREATMENT

Ledru R. Parker, San Antonio, Tex.

No Drawing. Application June 1, 1932,
Serial No. 614,851

1 Claim. (Cl. 134—17)

My invention relates to methods and means of treating belts and pulleys of machinery, and particularly to improvements in such methods and means wherein rubber is used.

It is an important object of my invention to provide a method and means of treating belts of machinery so as to prevent slippage and wear of the belts and preserve the pulleys in good condition.

It is also an important object of my invention to provide a method and means as described which also preserves the belt material and which does not require to be applied to the belt as frequently as do other substances which have been and are being used for similar purposes, and to increase the traction of belts and pulleys at a lower cost in expense of time and labor and material.

It is also an important object of my invention to provide a material for treating belts of the type described for increasing their efficiency, reducing wear thereof, and preserving the same at a cost which is lower than that which obtains in the cases of other similar treating materials quantity for quantity, and to provide that this less costly material be required in smaller quantities to produce efficient and desirable results of the type alluded to.

Other objects and advantages of my invention will be apparent from the following descriptions and explanations, wherein for purposes of illustration I have set forth a preferred embodiment of the invention.

The problem of overcoming slippage between belts and pulleys, and undue wear of both the belts and the pulleys, and to prevent natural disintegration of the material of which the belts are made, has long occupied scientific research in an endeavor to increase and maintain the operating efficiency of manufacturing plants and the like. These efforts have also been directed to reducing the enormous expense connected with keeping the belts and pulleys in condition and to extend their usefulness, for which purposes various "belt dressings" and "belt preservatives" in liquid and solid form for application to the belt while it is in motion, have appeared from time to time. It is well known that these preparations have afforded temporary relief, and a permanent method of curing the undesirable conditions has not yet been found. However, my method and composition disclosed herein goes farther in the direction of providing complete, permanent solution of the problem than any method and composition so far advanced.

It is claimed for my invention that there will be established a condition of the belt and pulley much superior to that attainable by the use of other methods and preparations in any given case, by the use of only one-third as much material as is required for comparable results utilizing any other known preparation.

There are two forms of my invention. One form contains only rubber. This rubber may be in any form whether raw, or in some refined form, or salvaged or waste rubber, or the rubber to be used may be such as is recovered from some other product in which the rubber may have been used. It is desired to cover by patent protection by means of this application the use of rubber in any form whatever for application to belts for preserving and dressing them to increase their efficiency and longevity, and to maintain the pulleys over which they travel in good condition. Many of the preparations now and heretofore used result in deposits of material upon the pulleys over which the belts run, so that these deposits or accumulations cause uneven relationships of the belts and pulleys and cause slippage and running off of the pulleys, with consequent great loss of time and material and danger to life in manufacturing operations. However, the substance of my invention does not produce this phenomena, but permits the pulleys to remain smooth and even as to surface. The use of rubber according to the principles of my invention is contemplated in either liquid or solid form or in any intermediate state.

The alternative or second form of my invention contemplates the use of rubber combined in definite proportions with neat's-foot oil, a well known belt preservative, but it is believed, used in connection with rubber for this purpose for the first time in my invention. The rubber in this form of the invention as well as in the first form described above prevents friction and when applied in fluid form to a belt, whether alone or in combination with neat's-foot oil, the rubber spreads over the working face of the belt and builds a uniform surface of non-slipping character. Though in the case of the utilization of some of the belt treating compositions now and heretofore used, the efficiency of the belts is reduced immediately after the application, a certain amount of running of the machinery being required before the desired increased traction begins to manifest itself. However, in the application of the invention the increased traction is immediately available as soon as the substance has been applied according to the method described herein.

The neat's-foot oil operates to hold the rubber in solution before application of the composition to the belt, and after application to the belt the neat's-foot oil acts as a preservative and in conjunction with the properties of fluid rubber, acts as a belt preservative and dressing, the neat's-foot oil penetrating the material of the belt, softening the texture thereof and increasing its flexibility, while directly contributing to the formation of a smooth, uniform surface of rubber upon the working face of the belt. Belts of all characters and of any material may be efficiently treated in the manner described. In the case of belts which have been subjected to strain or in the cases of belts, a portion or portions of the working face of which have been removed through friction or accident, the use of the first form of the invention, rubber alone, or the use of the second form of the invention, rubber combined with neat's-foot oil, in the manner described, will fill in the depressions and damaged portions of the working face of the belt and build a new, smooth and uniform non-slipping, long-wearing surface.

In order to achieve the greatest benefit of the combined properties of rubber and neat's-foot oil, care must be taken in the combination of these ingredients. As far as experiment presently indicates, proportions of one pound of neat's-foot oil to each thirteen (13) pounds of rubber form an efficient embodiment of my invention, that is, the second form thereof. Though I do not desire to be restricted to any particular means for assembling these ingredients into the combination form disclosed, I have found that the following method is fairly critical to the production of the particular modification set out herein.

The rubber used is first subjected to heat of sufficiently high degree to cause the melting of the rubber. The rubber is best heated in a receptacle having an angular bottom so that as soon as the rubber has been brought to a flowing condition, it will be moved gravitationally from the heat, the object being to remove the rubber from the heat as quickly as possible after it has gone into the liquid form. An advantage has been found in preserving and confining the fumes arising from the rubber melting operation and to return these into contact with the melting rubber as the melting progresses.

Immediately the rubber has moved from the heat, regular, uniform, and continuous agitation is applied thereto so as to amalgamate and reduce and integrate any particles which have not been completely melted in the melting process. During this agitation all foreign substances which are not subject to reduction to liquid form by the melting process are separated from the rubber fluid. A convenient way of accomplishing this separation of foreign substances is to pass the fluid rubber through fine wire screens into a receptacle where it may cool. During the cooling constant and rapid agitation must be continued until the temperature of the fluid rubber has gone down to 100° F. or less.

The neat's-foot oil in the proportions of one pound of neat's-foot oil to thirteen (13) pounds of the melted fluid rubber is introduced into the melted rubber at or below this temperature of 100° F. with agitation. The agitation is continued until the oil has entirely disappeared and becomes combined with the fluid rubber and until the temperature of the combined mass has gone down to room temperature. When the combined mass has reached room temperature, it is again passed through straining means and then to containers of suitable size and character in which the material of my invention may be marketed and stored.

The method of applying the composition of my invention to the belt is substantially as follows. It will be found convenient for the operator to employ a short paddle or spatula. The spatula is dipped in the composition and then the spatula is moved slowly back and forth at right angles with the belt while the belt is in motion. This will result in the depositing of a small amount of the composition of the invention upon the working face of the belt, and this small quantity, through the action of the belt and the spatula will be immediately distributed over the entire length of the belt and uniformly over its working face. For the first two or three days after initial application of the composition of the invention, several daily applications may be found necessary until it is observed that the belt working surface is taking on a uniform coating of rubber. As this takes place, the working face of the belt will have the appearance and color of the composition of the invention. As soon as this state of the belt has arrived, applications of the composition of the invention will not be required as often. Instances have been observed wherein it was necessary to apply subsequent applications of the composition of the invention only once or twice weekly. Of course, the amount required and the frequency of application necessitated will be governed by the type of belt, and the operating conditions thereof. However, it has been discovered as a uniform fact that the belts treated with the composition of my invention in the manner described require a smaller amount of treatment and at greater intervals than is the case with the use of any other efficient treatment known to me.

Though I have shown and described herein a preferred embodiment of the product and process of the invention, it is to be definitely understood that I do not desire to limit the application of the invention thereto, and any change or changes may be made in material and ingredients, and in the sequence and duration of steps and operations involved in the process, within the spirit of the invention and the scope of the subjoined claim.

What is claimed is:—

A substance for application to used leather and leather and rubber composition belts for the purpose of preventing wear of the belt and slippage of the belts on the pulleys, removing foreign substances collected on the belts before treatment, and keeping the pulleys clean, said substance consisting solely of rubber in fluid condition and only sufficient neat's-foot oil to maintain the rubber in fluid condition while on the belts and counteract the presence of oil and other belt deteriorating matter which may contact the belts while in use, the rubber and neat's-foot oil being present in the approximate proportions of 13 parts of rubber to 1 part of neat's-foot oil.

LEDRU R. PARKER.